United States Patent
Okmianski et al.

(10) Patent No.: US 8,484,214 B2
(45) Date of Patent: Jul. 9, 2013

(54) RECORD COMPRESSION USING INCREMENTAL REVERSE TEMPLATING

(75) Inventors: Anton Okmianski, Burnaby (CA); Mickael Graham, Bellevue Hill (AU)

(73) Assignee: Cisco Technology, Inc., San Jose, CA (US)

( * ) Notice: Subject to any disclaimer, the term of this patent is extended or adjusted under 35 U.S.C. 154(b) by 1631 days.

(21) Appl. No.: 11/692,676

(22) Filed: Mar. 28, 2007

(65) Prior Publication Data
US 2008/0240226 A1 Oct. 2, 2008

(51) Int. Cl.
*G06F 7/00* (2006.01)
*G06F 17/30* (2006.01)

(52) U.S. Cl.
USPC ............... 707/737; 707/748; 707/758

(58) Field of Classification Search
USPC ............... 707/727, 748, 758, 737
See application file for complete search history.

(56) References Cited

U.S. PATENT DOCUMENTS

| | | | |
|---|---|---|---|
| 6,618,736 B1 * | 9/2003 | Menage | 1/1 |
| 7,152,055 B2 * | 12/2006 | Loschky et al. | 1/1 |
| 7,231,599 B2 * | 6/2007 | Yamada et al. | 715/246 |
| 7,519,607 B2 * | 4/2009 | Anderson, IV | 1/1 |
| 7,664,881 B2 * | 2/2010 | Le Pennec et al. | 709/247 |
| 2001/0051962 A1 * | 12/2001 | Plotkin | 707/522 |
| 2002/0002567 A1 * | 1/2002 | Kanie et al. | 707/513 |
| 2002/0016786 A1 * | 2/2002 | Pitkow et al. | 707/3 |
| 2003/0083900 A1 * | 5/2003 | Khriss et al. | 705/1 |
| 2005/0232473 A1 * | 10/2005 | Liu | 382/124 |
| 2006/0031379 A1 * | 2/2006 | Kasriel et al. | 709/213 |
| 2006/0149751 A1 * | 7/2006 | Jade et al. | 707/100 |
| 2007/0282874 A1 * | 12/2007 | Metcalfe | 707/101 |
| 2008/0033807 A1 * | 2/2008 | Black et al. | 705/14 |
| 2008/0294479 A1 * | 11/2008 | Emling et al. | 705/7 |
| 2009/0019020 A1 * | 1/2009 | Dhillon et al. | 707/4 |

OTHER PUBLICATIONS

Janusz Wnek, "Machine Learning of Generalized Document Templates for Data Extraction", 2002.*

* cited by examiner

*Primary Examiner* — Brannon W Smith
(74) *Attorney, Agent, or Firm* — Haynes and Boone, LLP

(57) ABSTRACT

In one embodiment, a method for compression is disclosed, including receiving source data, creating at least one template based upon common data, and creating a compressed record including a reference to the at least one template and a template delta that represents a difference between the at least one template and source data.

16 Claims, 9 Drawing Sheets

RECORD COMPRESSION USING INCREMENTAL REVERSE TEMPLATING

TECHNICAL FIELD

The present disclosure relates generally to data compression and network management.

BACKGROUND

Data compression is desirable in many situations for efficiently storing, providing, maintaining, and/or transferring data. In systems which maintain large data sets, eliminating data redundancy is paramount to efficiency. The redundancy increases storage requirements and has a detrimental impact on read/write performance because caches become less efficient. In environments where millions of large records have to be maintained, this presents a significant challenge. Furthermore, in some situations, it is necessary to compress data incrementally where records are added one by one over the life cycle of the system.

In one case, network management systems are required to collect large amounts of data from devices. When centrally managing home networks, this may be millions of devices. This data may include configuration settings, live performance and fault data, device logs, etc. For example, a service provider may desire to actively manage consumer home devices and backup entire device configuration settings several times a day in order to offer customers a restore function or to handle seamless replacement of devices while preserving user-settings. The data that needs to be stored is often highly redundant across millions of devices. Compressing individual records in isolation is not efficient because this does not take advantage of similarities across data records.

In another case, designated servers of a distributed management system may generate management policy for devices based on templates and distribute the generated policy instructions to enforcement elements. It may not be desirable to distribute information about some common templates the policy is derived from across the system, but rather it may be preferable for enforcement elements to be able to receive a complete set of instructions for each client and compress data incrementally, which provides for a more loosely coupled system design.

Figure 1:
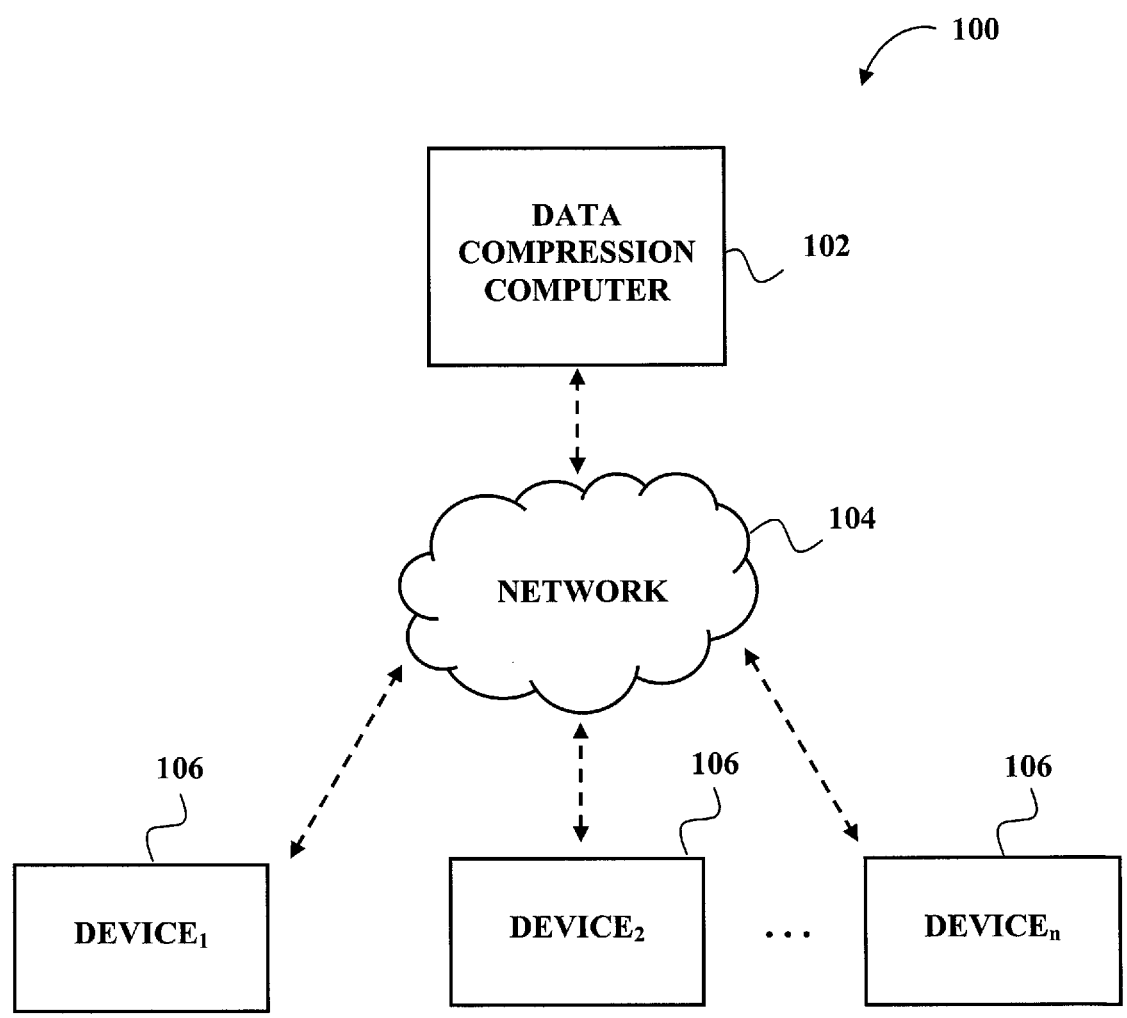
FIG. 1 illustrates an example system for data compression.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DESCRIPTION OF EXAMPLE EMBODIMENTS

In accordance with an embodiment of the present invention, an apparatus is provided including an interface operable to receive a plurality of source data and a processor operable to create at least one template based upon common data from the plurality of source data. The processor is also operable to create a compressed record including a reference to at least one template and a template delta that represents a difference between the template and one of the plurality of source data.

In accordance with another embodiment of the present invention, logic encoded in one or more tangible media for execution is provided, the logic when executed being operable to receive a plurality of source data, create at least one template, and create a compressed record as described above.

In accordance with another embodiment of the present invention, a method is provided, including receiving a plurality of source data, creating at least one template, and creating a compressed record as described above.

Table 1 below provides a description of terms applicable throughout this document.

TABLE 1

| Term | Description |
| --- | --- |
| Source Record | An original record with uncompressed data that is being added to the system. |
| Source Data | The uncompressed data of the Source Record. |
| Source Data Size | The amount of storage space required to store Source Data. |
| Stored Record | The record with Compressed Data stored in the database. |
| Compressed Data | A representation of Stored Record Data after compression. |
| Template Catalog | A persistent collection of re-usable Templates. |
| Template | A set of common data re-used by a number of Stored Records. |
| Template Identifier | A unique identifier used to represent a specific Template. |
| Template Data | The data represented by the Template. |
| Retired Template | A Template, which is no longer used for compressing new Source Records. It can still be referenced and used by existing Stored Records. |
| Active Template | Any non-Retired Template. The most efficient Active Template is chosen during compression. |
| Popularity Metric | A value representing frequency of the respective Template used in Stored Records. This could be a simple reference counter or some approximate metric which does not require transactional updates in one example. |
| Template Delta | Representation of a data difference between Source Data and Template Data. |
| Template Delta Size | The amount of storage space required to store Template Delta. |
| Match Ratio | A metric representing closeness of match of a given Source Record to a given Template. It can be calculated as follows: (Source Data Size − Template Delta Size)/Source Data Size. Example: If Source Data matches Template completely, the ratio is 1. The larger the Template Delta for a given Source Data, the lower the Match Ratio for this record. |

TABLE 1-continued

| Term | Description |
| --- | --- |
| Average Match Ratio | A metric for representing the average of Match Ratios for all Stored Records using a given Template. It can be calculated as a sum of Match Ratios for the Template divided by number of Stored Records using the Template. |
| Relative Match Ratio | A metric representing both popularity and efficiency of a given Template. In other words, it is a measurement of a Template's contribution to the Total Match Ratio. It may be calculated as Average Match Ratio weighted by the Popularity Matrix. |
| Total Match Ratio | A measure of total compression provided by the system for all Stored Records. It can be calculated as a weighted average of Average Match Ratios of all Active Templates. The weight is determined by the Popularity Metric of the Template. Example: Suppose we have 2 Active Templates. First template is used by 5 records with Average Match Ratio of 1 (direct match). Second template is used by 5 records with Average Match Ratio of 0.8. Then, the Total Match Ratio is 0.9. |

Dictionary-based algorithms for data compression are known. Many of these types of algorithms rely on building a dictionary of reusable blocks which are repeated within a current data set. The various algorithm variations compete in their approach towards finding the most optimal repeatable blocks in the most efficient manner. However, dictionary-based algorithms are not well suited for a situation where data records are added incrementally and concurrently. Dictionary-based algorithms find many small repeatable blocks in a current data set as opposed to a major pattern, like a form template, that could be common across many different data records over time. When many data records are added over time, as in the case of a database, dictionary-based algorithms have been previously used on individual records, rather than incrementally updating the dictionary as new records appear based upon a set of records.

Dictionary-based algorithms also typically take a very low-level (general) approach to data compression without taking into account, for example, that order of certain elements may not be significant in a given domain. In essence, they do binary comparisons without assuming much about how the data could be specialized in a given domain. For example, if a device configuration is represented as name-value pairs, the order may not matter, yet standard compression algorithms will treat such data as different if the same two name-value pairs appear in different order.

Another type of data compression algorithm is known as delta-coding. These algorithms are often used in compressing streamed data where a subsequent record has some natural relationship to a previous record. For example, in video this relationship is based on timing. Each frame can have a context of a previous frame by simply keeping the last frame in memory buffer. For every portion of data, these algorithms attempt to describe the portion using deltas from the previous portion. MPEG is an example of such an algorithm, which takes advantage of incremental changes of picture from frame to frame. However, delta-coding algorithms are not well suited for the case of stored records, in which records may be unrelated and can be independently added and removed in any order. Making one record depend on a previous unrelated record is impractical and also increases the retrieval overhead.

In accordance with embodiments of the present disclosure, an advantageous system, method, and logic encoded in one or more tangible media for execution are provided which detect similarities among records as they are added into a system substantially without an overhead of buffering records or retrieving a large number of old records during compression. A "reverse templating" algorithm for efficiently compressing data incrementally is disclosed, being particularly advantageous for compressing data with a high-level of redundancy and including certain patterns or templates. The algorithm dynamically detects or generates an applicable set of templates in an environment of data from different types of devices or different types of services and uses the templates without re-reading previously stored records or buffering a large number of records. The compressed data references one template and describes the delta from the template if any. The algorithm reduces the amount of total delta information stored in the system, while minimizing the number of templates used for compression in order to maintain appropriate speed of compression.

Referring to FIG. 1, an example system 100 for data compression and/or management is illustrated. System 100 includes a data compression computer 102, devices 106, and a network 104 through which computer 102 and devices 106 may communicate.

In one example, computer 102 executes an algorithm that finds the most applicable template for a given data record out of a set of automatically derived templates. Templates may be derived from detected common data within source records from devices 106. The compressed data references one template (e.g., via a template identifier) and describes a delta from the template if any. A delta describes the difference of source data from the template and can itself be further compressed using legacy compression algorithms. The templates are automatically and dynamically derived, managed, and re-evaluated as new records are added such that system target compression is achieved while the number of templates needed during compression is minimized. Old records need not be re-read. Templates which contribute most to compression efficiency remain in the system and are categorized as "active" while inefficient templates are "retired" in an unintrusive way. In one embodiment, direct control over compression time used for a new record is provided by limiting the number of allowed active templates. Domain-specific algorithms may also be used to determine template delta. For certain domains where appropriate, elements within a record may be treated as an unordered set allowing for a higher rate of template matching.

In one example, computer 102 periodically obtains and maintains backup snapshots of configurations for a plurality of devices. These configurations can be represented as a set of parameter name-value pairs in a further example. Most of the configuration snapshot data will be identical for many devices, and some minor difference may exist where configurations differ to user-specific settings. No prior knowledge may be available regarding which parts of data may be redundant and which may vary.

Network 104 may include various networks such as a public switched telephone network (PSTN), an integrated services digital network (ISDN), a local area network (LAN), a wide area network (WAN), a metropolitan area network, and/or a wireless local area network (WLAN), that support standards such as Ethernet, wireless fidelity (WiFi), and/or Voice over Internet Protocol (VoIP). Other protocols for communication are also within the scope of the present invention. Communication network 104 may generally include any network capable of transmitting audio and/or video telecommunication signals, data, and/or messages, and may be implemented in any form of a wireless or wireline communication network.

Devices 106 may be various devices that communicate with network 104, including but not limited to personal computers, PDAs, telephones, and consumer premises equipment such as modems, gateways, VoIP adaptors, and IPTV set top boxes. Devices 106 may communicate with network 104 via various forms of wireless or wireline communication protocols.

Figure 2:
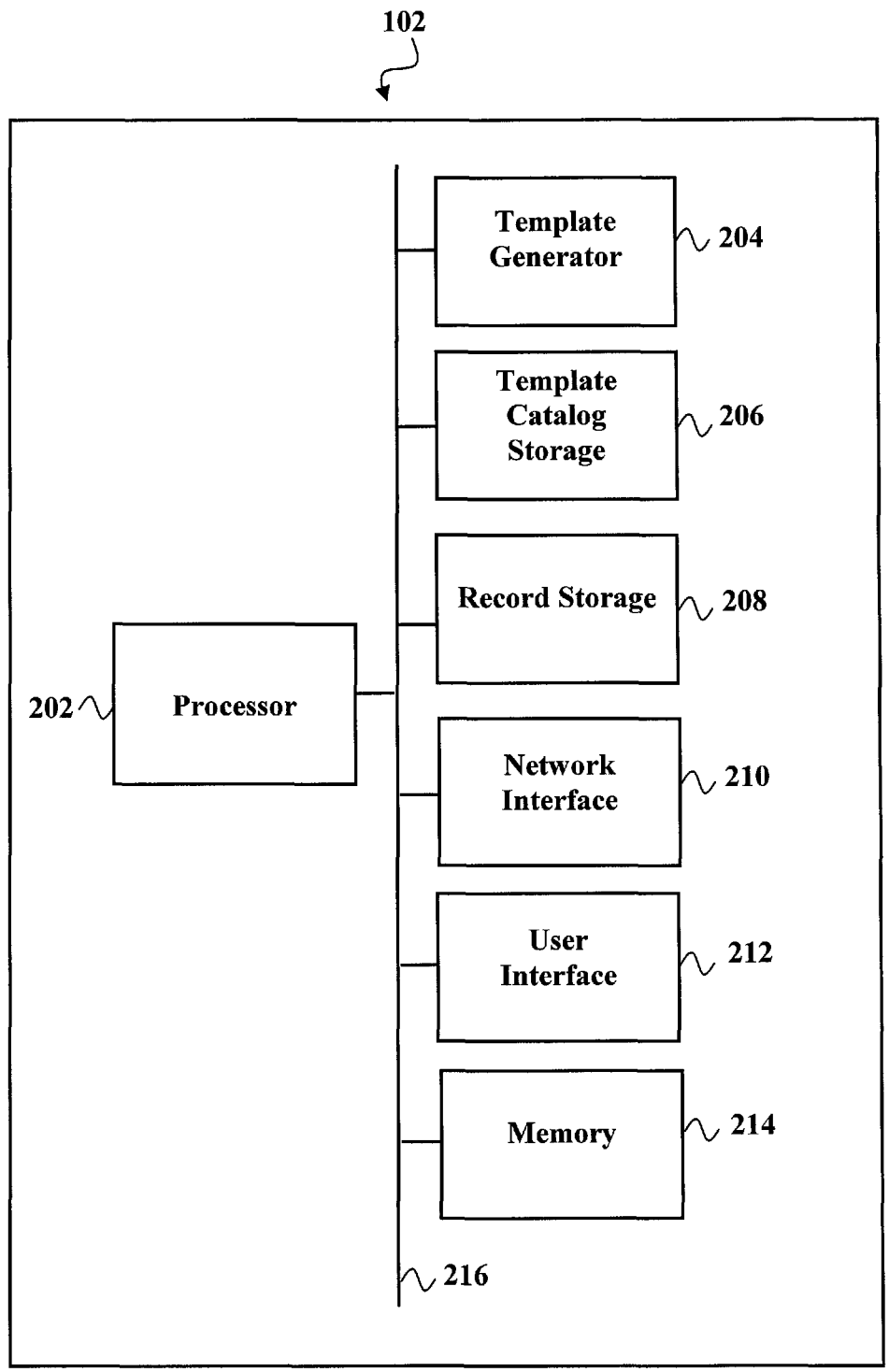
FIG. 2 illustrates an example data compression computer illustrated in FIG. 1.

Referring now to FIG. 2 in conjunction with FIG. 1, example data compression computer 102 is illustrated in more detail. Computer 102 includes a processor 202 operably coupled via a bus 216 to the following components: a template generator 204, a template catalog storage 206, a record storage 208, a network interface 210 via an input/output port; a user interface 212 via an input/output port; and a memory 214 (e.g., SDRAM or flash memory) via a memory interface.

Processor 202 may be a microprocessor, controller, or any other suitable computing device or resource. Processor 202 may include a variety of processors (e.g., digital signal processors), conventional CPUs being applicable. When a source record is received at computer 102, processor 202 may use system components to compress, store, and/or manage the data.

Template generator 204 may be any combination of hardware, software, and/or encoded logic, and is used to generate templates.

Template catalog storage 206 stores active and/or retired templates generated by template generator 204. Template catalog storage 206 is a component that stores information in any applicable medium, such as a database.

Record storage 208 includes stored records after compression. Record storage 208 is a component that stores information in any applicable medium, such as a database.

Network interface 210 includes in one example, an adaptor for providing wired communications with a network, such as a LAN connector (e.g., a 10/100/1000 Base-T Ethernet port) via a MII interface, and/or a transmitter/receiver (transceiver) for providing wireless communications with a network and/or wireless device. Network interface 210 may communicate using any of various protocols known in the art for wireless or wired connectivity in one example.

User interface 212 is operably coupled to processor 202 and may include data input means, such as a keyboard, mouse, etc., and data display means, such as a display system. In one example, user interface 212 may include an alphanumeric keypad and screen for entering or displaying compression parameters, such as target total match ratio, number of templates, and/or other information. Other types of user interfaces, such as touch screens, are within the scope of the present invention.

Memory 214 may include a variety of volatile or non-volatile memories, and in one example includes without limitation, magnetic media, optical media, random access memory (RAM), read-only memory (ROM), flash memory, removable media, or any other suitable local or remote memory component, or combination thereof. In one example, memory 214 may be used to store passwords, network and telecommunications programs, various protocols, and/or an operating system (OS).

It will be recognized by those of ordinary skill in the art that computer 102 may include any number of processors, storage, memory modules, and interfaces to accomplish the functionality and features described herein. Furthermore, computer components (e.g., processor 202, template generator 204, template catalog storage 206, record storage 208, and memory 214) may be centrally located with respect to one another, or distributed throughout a network.

Furthermore, it should be understood that data is not limited to originating from devices, but may be from a system component, such as a process or subsystem on the same operating system, and that data may be transferred via mechanisms other than a network or network interface, such as by a direct local application library call. Accordingly, a data compression/management system need not be distributed in other embodiments. For example, an application generating weather reports based on sensors may store the reports in a database. The database can determine templates from the plurality of reports and store data more efficiently with the present invention.

Figure 3:
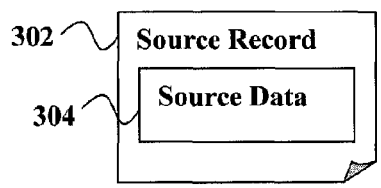
FIG. 3 illustrates an example representation of a source record.

FIG. 3 illustrates a representation of an example source record 302 including source data 304.

Figure 4:
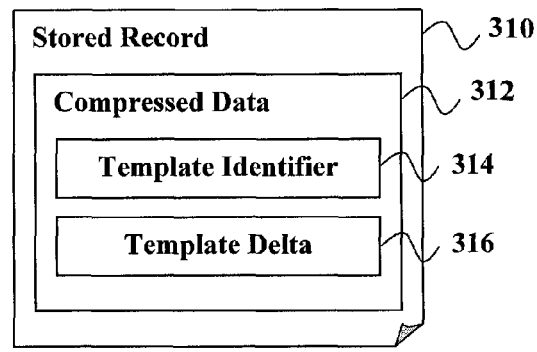
FIG. 4 illustrates an example representation of a stored record.

FIG. 4 illustrates a representation of an example stored record 310 including compressed data 312, a template identifier 314, and a template delta 316.

Figure 5:
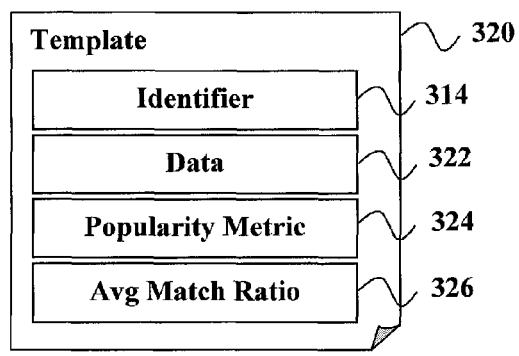
FIG. 5 illustrates an example representation of a template.

FIG. 5 illustrates a representation of an example template 320 including identifier 314, data 322, a popularity metric 324, and an average match ratio 326.

Figure 6:
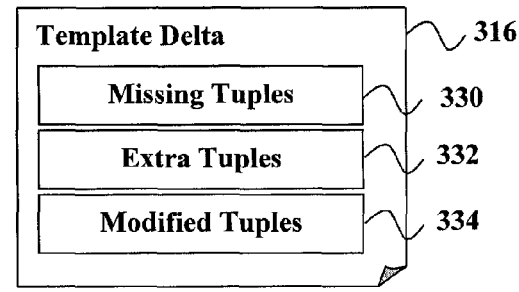
FIG. 6 illustrates an example representation of a template delta.

FIG. 6 illustrates a representation of example template delta 316 including missing tuples 330, extra tuples 332, and modified tuples 334. In one embodiment, template delta 316 is represented as an unordered set of tuples (records). The tuple may, for example, contain a parameter name as unique identifier, and a parameter value or other data. In many domains, the order of tuples is not significant and an unordered set of tuples presents significant benefits in complexity of calculating the delta and match ratio. The source data is then represented using the unordered set of tuples in the same way. By comparing the set, the template delta is calculated, including lists of missing, extra, and/or modified tuples.

Figure 7:
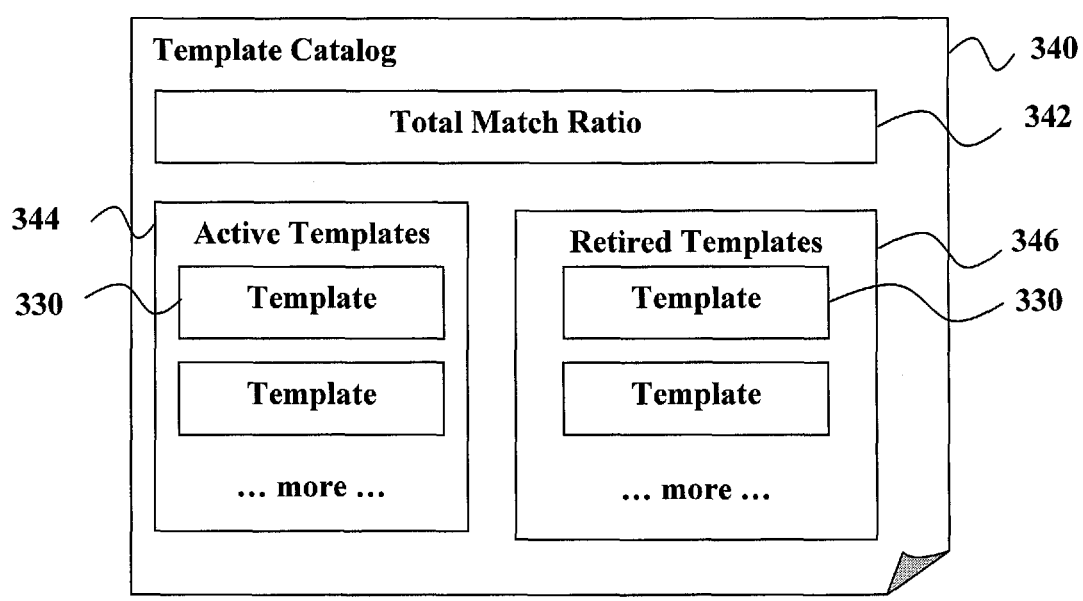
FIG. 7 illustrates an example representation of a template catalog.

FIG. 7 illustrates a representation of an example template catalog 340 including a total match ratio 342, active templates 344, and retired templates 346. In one embodiment, only active templates are used during compression as distinguished from retired templates. Retired templates may continue to exist in the system for as long as they are referenced by stored data in one embodiment.

Figure 8:
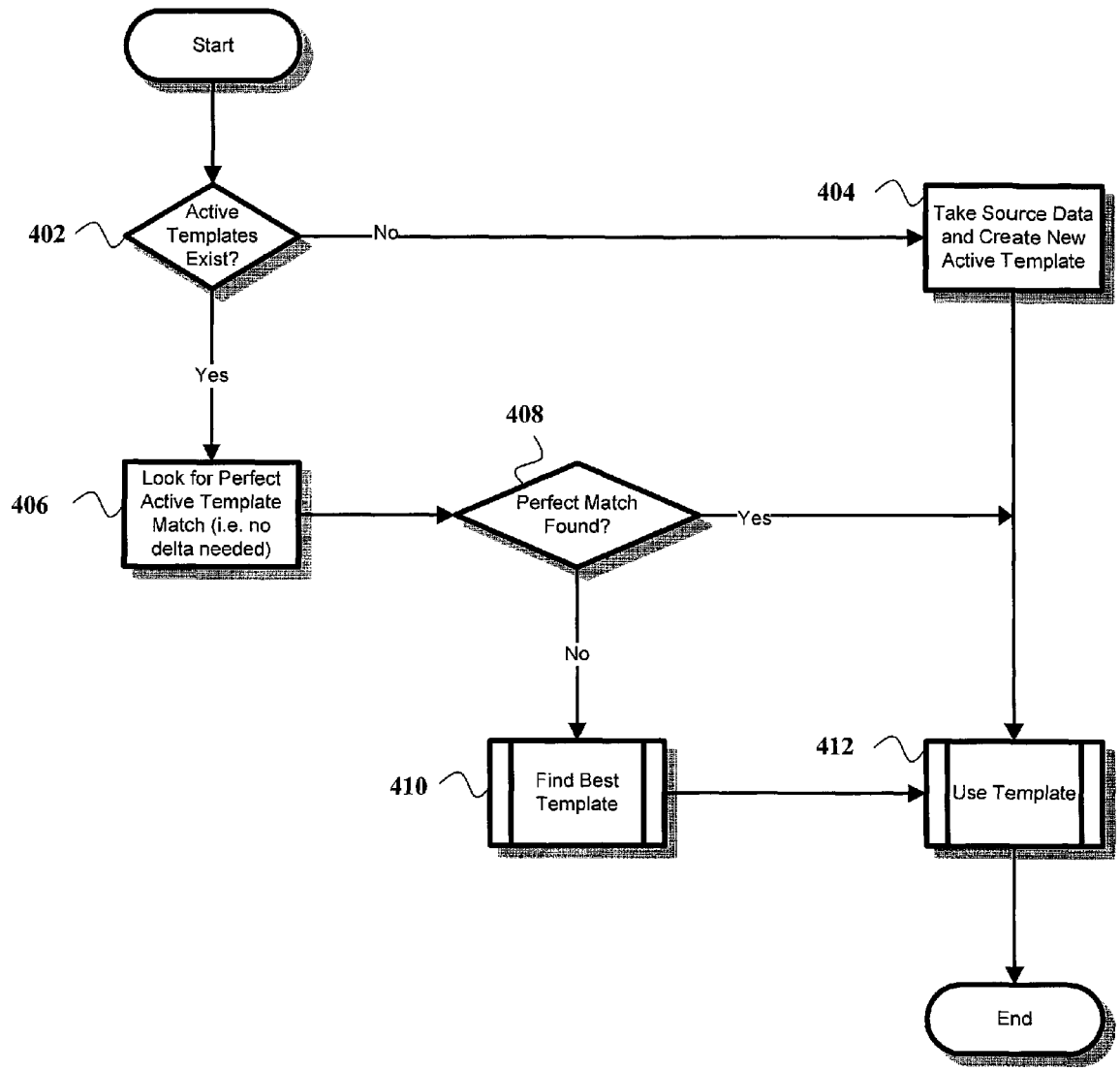
FIG. 8 illustrates an example method of data compression.

Referring now to FIG. 8 in conjunction with FIGS. 1-7, an example method of data compression is illustrated in a flow-chart. At decision block 402, a decision is made whether active templates exist in a template catalog. If no from decision block 402, source data is used to create a new active template at functional block 404, and the template may be used at functional block 412. If yes from decision block 402, the active templates are searched for a perfect active template match (i.e., an active template having a template delta of zero) at functional block 406. If a perfect match is found at decision block 408, the template may be used at functional block 412. If a perfect match is not found, the best template is found at functional block 410, and the best template may be used for compression at functional block 412.

It is noted that different ways of representing a template and calculating a template delta may be used, including a number of text differencing mechanisms such as the diff utility, which is a file comparison utility that outputs the differences between two files. The delta is then represented as data that can be stored in memory.

Figure 9:
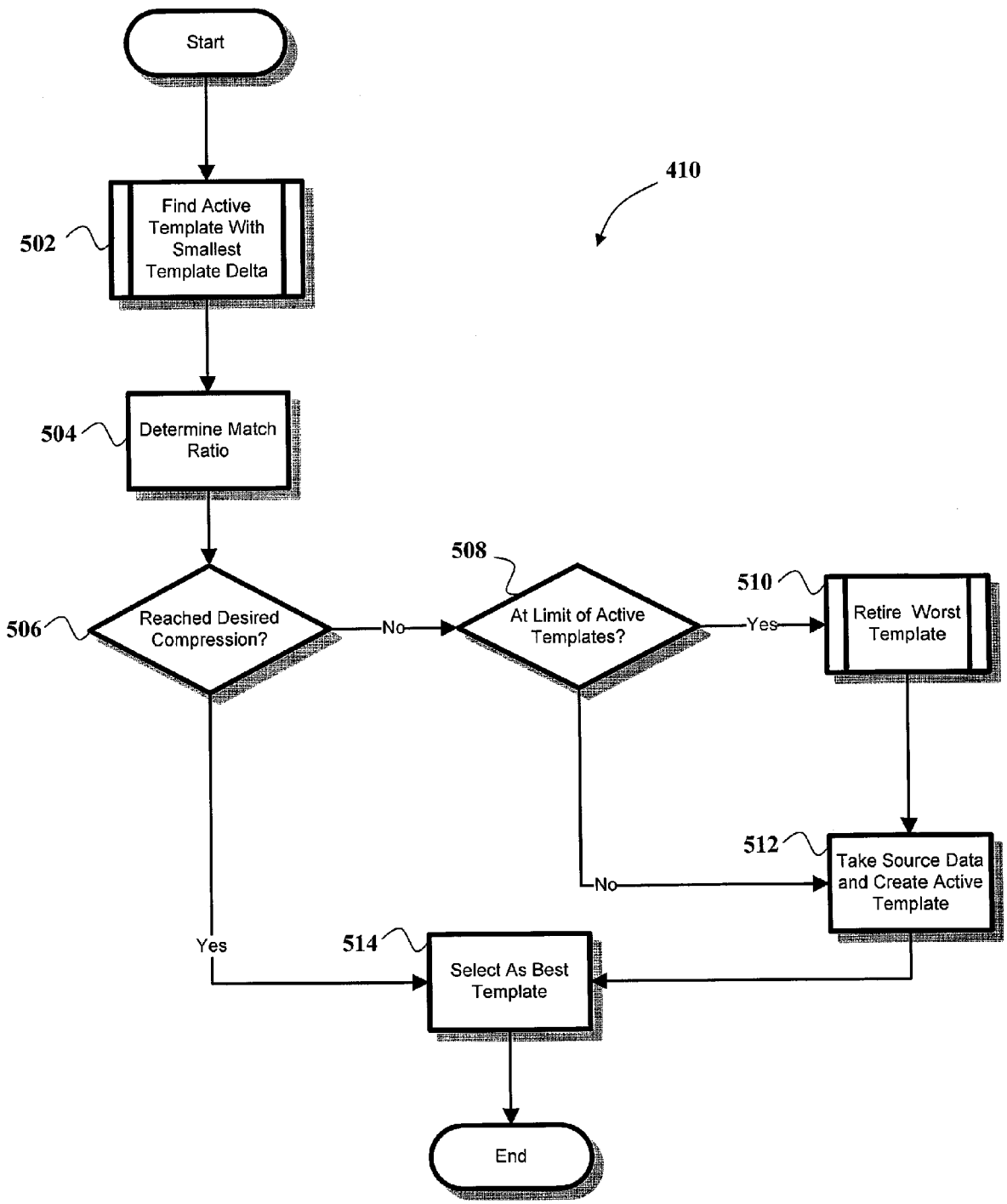
FIG. 9 illustrates an example method for providing the best template illustrated in FIG. 8.

FIG. 9 illustrates an example method for finding the best template illustrated in FIG. 8 at functional block 410. In one embodiment, functional block 410 includes determining a template delta for each active template and then finding an active template with the smallest template delta at functional block 502. At functional block 504, a total match ratio for all active templates is determined, and at decision block 506, a decision is made whether desired compression has been reached by comparing the total match ratio to a target match ratio that may be pre-selected, and/or set by the user at a desired time. If yes from decision block 506, the template with the smallest template delta is selected as the best template at functional block 514. If no from decision block 506, a decision is made whether a limit of active templates has been exhausted at decision block 508. The limit can be based on a fixed number of templates, total template data size, amount of available memory, or various other metrics that are statically preset or changeable by a user. If yes from decision block 508, the template having the smallest relative match ratio (i.e., the worst template) is moved to a retired template list within a template catalog (i.e., retired) at functional block 510, and then source data is used to create an active template at functional block 512. If no from decision block 508, source data is used to create an active template at functional block 512 without retiring a template. The created template is selected as the best template at functional block 514.

It is noted that the target total match ratio can be statically set for a particular domain/deployment in one embodiment and/or can also be adjusted at any point in another embodiment. If the target total match ratio is reached, the system will go into equilibrium (i.e., the active template set will remain stable until the total match ratio is again under the target). If the target total match ratio is poorly selected and cannot be reached due to a large variation of data, the system will keep recycling through the templates. This will generate an ever-growing set of retried templates, but the templates with the highest popularity metric will remain in the system longer. The effect of recycling through many templates does not have a negative impact on time of compression but may increase the average decompression time because retired templates have to be accessed from storage in addition to reading stored record compressed data.

Figure 10:
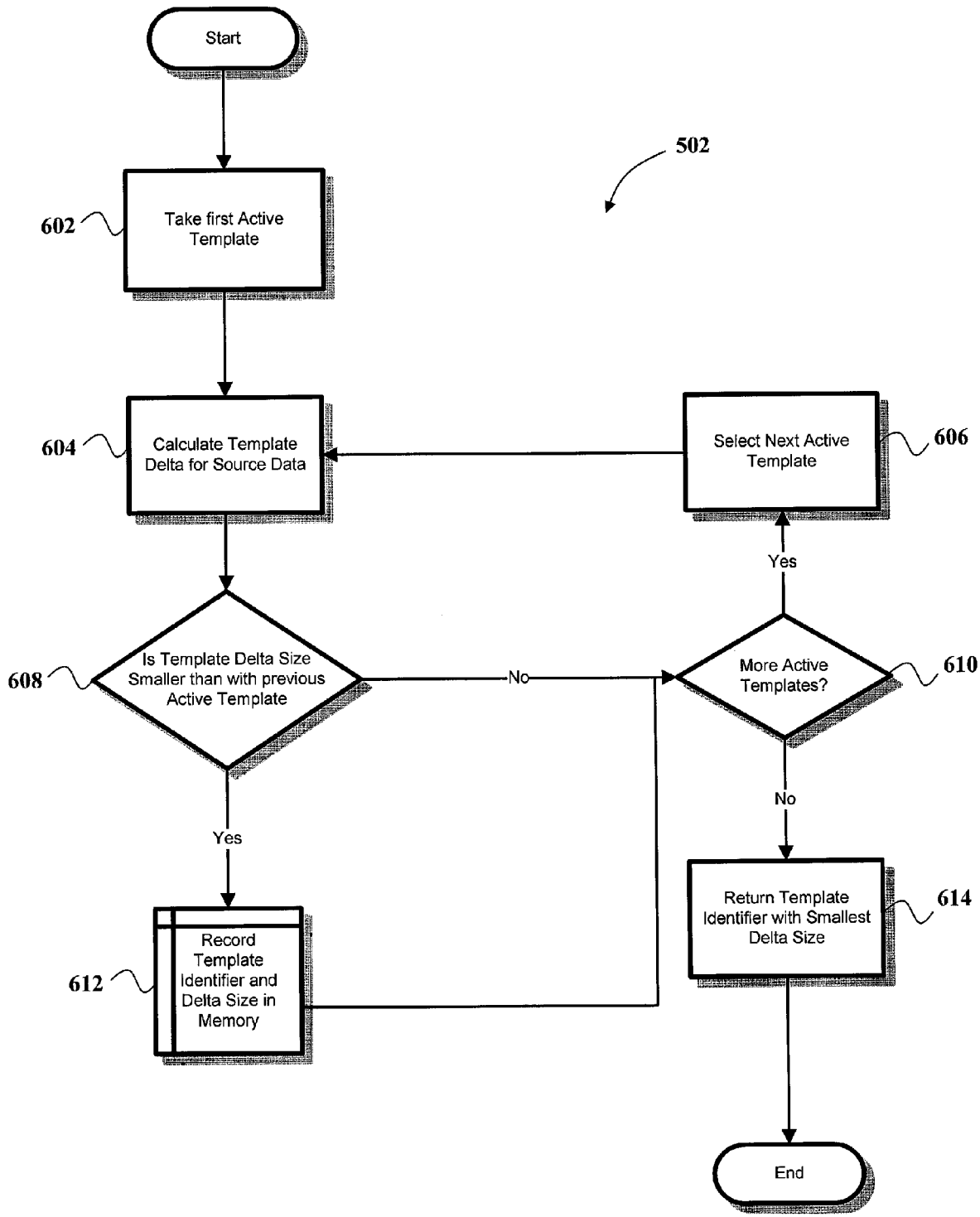
FIG. 10 illustrates an example method for finding a template with the smallest template delta illustrated in FIG. 9.

FIG. 10 illustrates an example method for finding a template with the smallest template delta illustrated in FIG. 9 at functional block 502. In one embodiment, functional block 502 includes selecting a first active template at functional block 602, calculating a template delta at functional block 604, and then making a decision whether the template delta size is smaller than a previous active template delta size at decision block 608. If yes at decision block 608, the template identifier and delta size are recorded in a memory at functional block 612 and a decision is made whether more active templates exist at decision block 610. If no at decision block 608, the method moves directly to decision block 610 to make a decision whether there are more active templates. If yes at decision block 610, the next active template is selected at functional block 606 and the method repeats to functional block 604. If no at decision block 610, the template identifier with the smallest delta size is returned at functional block 614.

Figure 11:
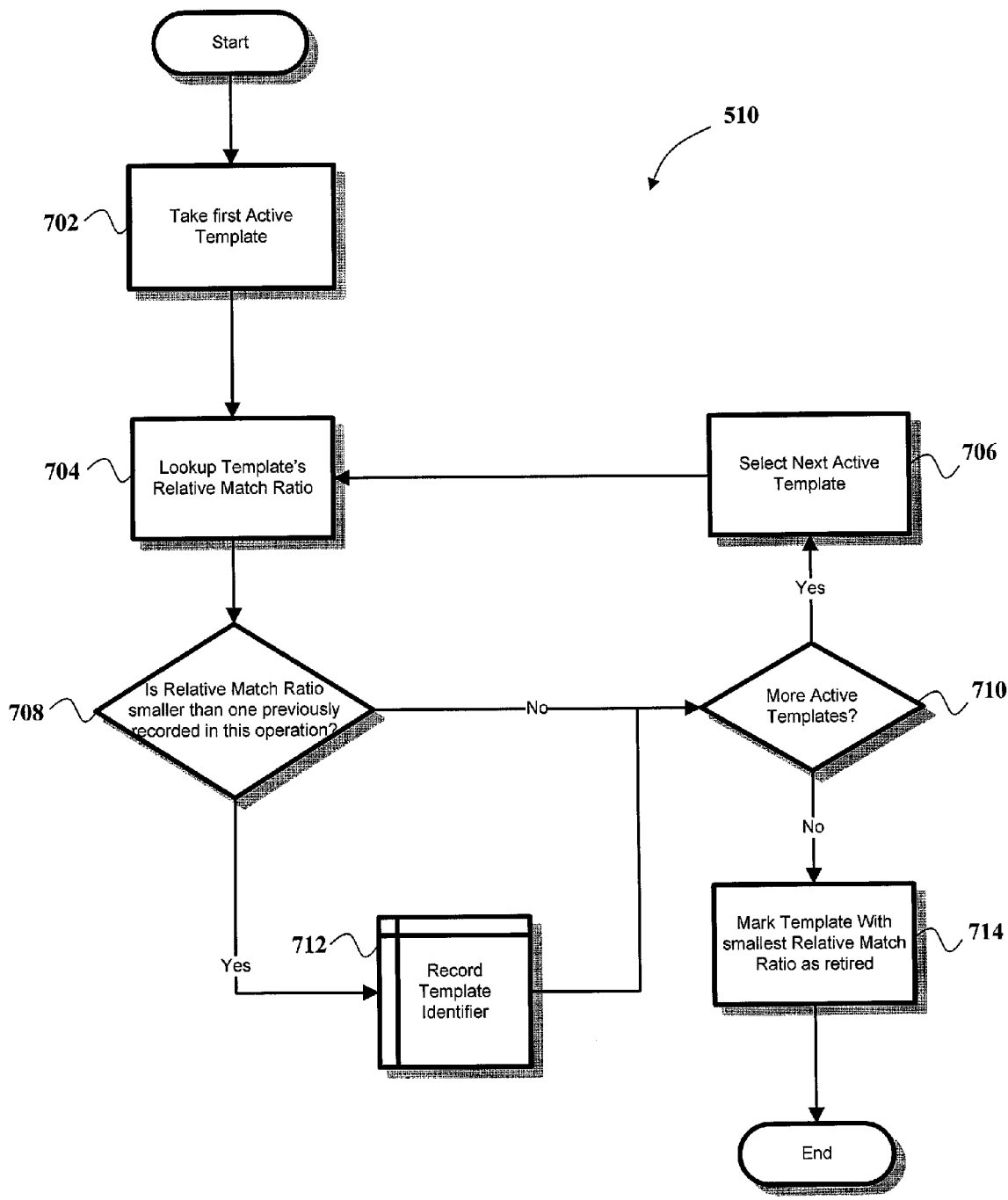
FIG. 11 illustrates an example method for retiring a template illustrated in FIG. 9.

FIG. 11 illustrates an example method for retiring a template illustrated in FIG. 9 at functional block 510. In one embodiment, functional block 510 includes selecting an active template at functional block 702, looking up the template's relative match ratio at functional block 704, and making a decision whether the relative match ratio is smaller than a previously recorded relative match ratio at decision block 708. If yes at decision block 708, the template identifier is recorded at functional block 712 and the method moves to functional block 710, but if no, a decision is made whether more active templates are available at decision block 710. If more active templates are available, a next active template is selected at functional block 706 and the method repeats at functional block 704. If more active templates are not available, the template with the smallest relative match ratio is retired at functional block 714.

In one embodiment, a reset function may be provided to the user (e.g., via a user interface) for retiring all templates immediately and for starting from a new template added to the system, thereby allowing for quicker adjustment of the algorithm to a changing environment. An automatic reset (scheduled and/or calculated) may also be incorporated into the algorithm if large changes in source data are expected to be frequent.

Figure 12:
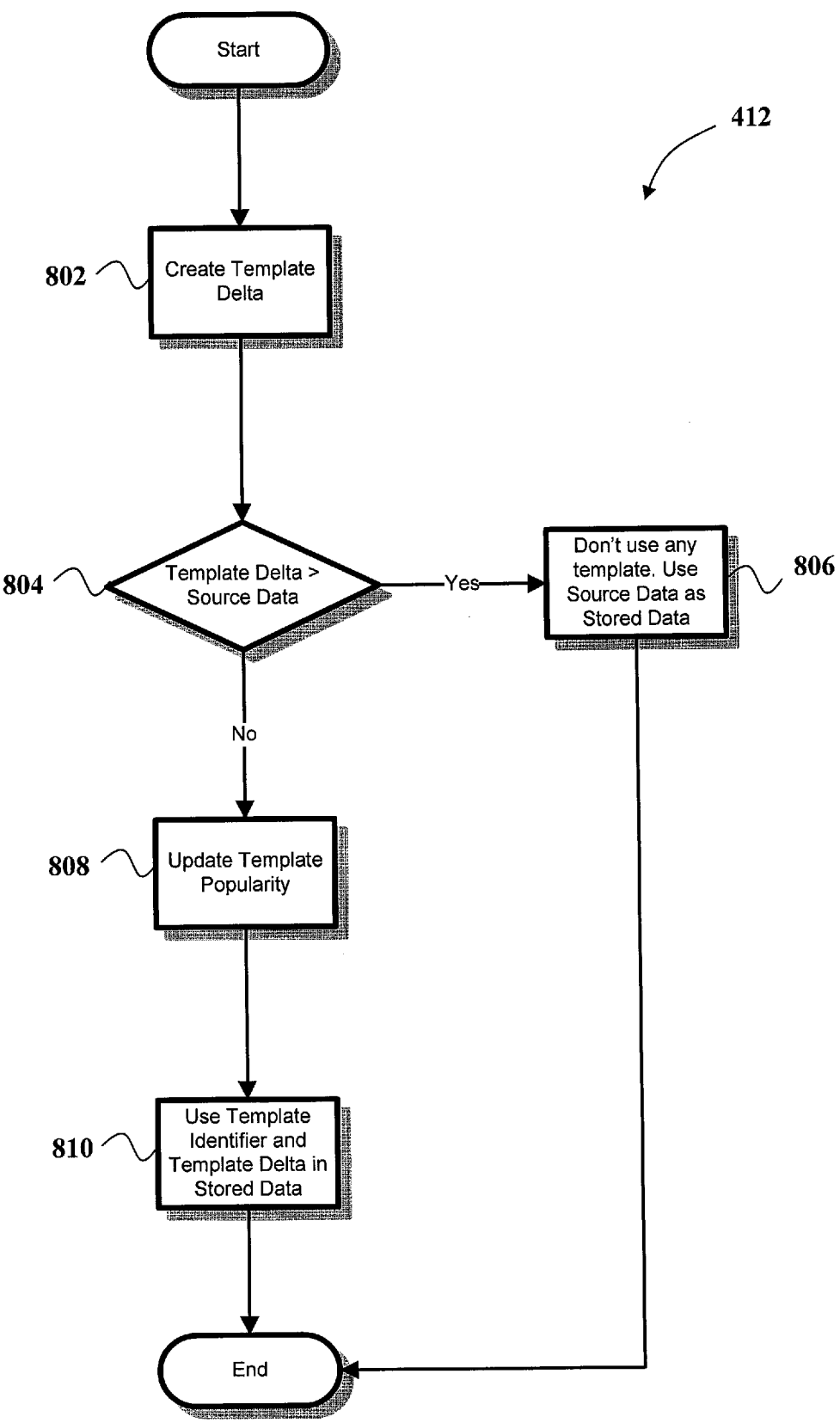
FIG. 12 illustrates an example method for using a template illustrated in FIG. 8.

FIG. 12 illustrates an example method for using a template illustrated in FIG. 8 at functional block 412. In one embodiment, functional block 412 includes determining the template delta of the template at functional block 802, and then comparing the size of the template delta with the size of the source data at decision block 804. If the size of the template delta is smaller than the size of the source data (e.g., no in a decision block with the inequality template delta size>source data size), the template is used. The template popularity is updated at functional block 808, and the template identifier and template delta are stored in the compressed data of the stored record at functional block 810. If the size of the template delta is greater than the size of the source data (e.g., yes in the decision block), the template is not used and the source data is stored in the compressed data of a stored record without compression at functional block 806, thus avoiding storage of "negative" compression.

Advantageously, embodiments of the present invention provide for high-level compression of records including redundant data, which allows the system to scale higher and perform more efficiently with minimal overhead. The incremental nature of the algorithm does not require that previously compressed records be re-evaluated (e.g., that stored records be read or re-compressed) when a new record is added. The compression time can be directly controlled by restricting the number of active templates allowed to be used. The algorithm dynamically adjusts to changing data by creating new templates. The algorithm is also designed to converge on the target compression ratio which can be configured for a given domain.

Embodiments described above illustrate but do not limit the invention. It should also be understood that numerous modifications and variations are possible in accordance with the principles of the present invention. Accordingly, the scope of the invention is defined only by the following claims.

We claim:

1. An apparatus comprising:
   an interface operable to receive a plurality of source data; and
   a processor operable to:
      create a plurality of active templates based upon common data from the plurality of source data, wherein the source data is read as an unordered set,
      determine, for each of the plurality of active templates, a match ratio calculated as a source data size minus a template delta size divided by the source data size;
      determine a total match ratio of the plurality of active templates, wherein the total match ratio is calculated as a weighted average of average match ratios of the active templates and a weight is determined by a popularity metric of each active template;
      compare the total match ratio of the plurality of active templates to a target total match ratio,
      determine whether a limit of active templates has been reached when the total match ratio is less than the target total match ratio, retire a template having a smallest relative match ratio from the plurality of active templates when the limit of active templates has been reached to limit the number of active templates considered for use in compression, create a best active template when the total match ratio is less than the target total match ratio, and create a compressed record including a reference to the best active template and a template delta that represents a difference between the best active template and one of the plurality of source data.

2. The apparatus of claim 1, wherein the processor is further operable to select a template having the smallest template delta from the plurality of active templates.

3. The apparatus of claim 1, wherein the processor is further operable to determine a match ratio between at least one active template and the source data.

4. The apparatus of claim 1, wherein at least one active template includes an identifier, template data, a popularity metric, and an average match ratio.

5. The apparatus of claim 4, wherein the processor is further operable to determine a relative match ratio calculated as the average match ratio weighted by the popularity metric.

6. The apparatus of claim 1, further comprising a template generator, a template catalog storage, a record storage, and a user interface.

7. Logic encoded in one or more non-transitory tangible media for execution and when executed operable to:

receive a plurality of source data;

create a plurality of active templates based upon common data from the plurality of source data, wherein the source data is read as an unordered set;

determine, for each of the plurality of active templates, a match ratio calculated as a source data size minus a template delta size divided by the source data size;

determine a total match ratio of the plurality of active templates, wherein the total match ratio is calculated as a weighted average of average match ratios of the active templates and a weight is determined by a popularity metric of each active template;

compare the total match ratio of the plurality of active templates to a target total match ratio;

determine whether a limit of active templates has been reached when the total match ratio is less than the target total match ratio;

retire a template having a smallest relative match ratio from the plurality of active templates when the limit of active templates has been reached to limit the number of active templates considered for use in compression;

create a best active template when the total match ratio is less than the target total match ratio; and create a compressed record including a reference to the best active template and a template delta that represents a difference between the best active template and one of the plurality of source data.

8. The logic of claim 7, further operable to select a template having the smallest template delta from the plurality of active templates.

9. The logic of claim 7, further operable to determine a match ratio between at least one active template and source data from a device.

10. The logic of claim 7, wherein at least one active template includes an identifier, template data, a popularity metric, and an average match ratio.

11. The logic of claim 10, further operable to determine a relative match ratio calculated as the average match ratio weighted by the popularity metric.

12. A method comprising:

receiving a plurality of source data via a network interface;

creating, using a processor, a plurality of active templates based upon common data from the plurality of source data, wherein the source data is read as an unordered set;

determining, for each of the plurality of active templates, a match ratio calculated as a source data size minus a template delta size divided by the source data size;

determining a total match ratio of the plurality of active templates, wherein the total match ratio is calculated as a weighted average of average match ratios of the active templates and a weight is determined by a popularity metric of each active template;

comparing, using the processor, the total match ratio of the plurality of active templates to a target total match ratio;

determining, using the processor, whether a limit of active templates has been reached when the total match ratio is less than the target total match ratio;

retiring, using the processor, a template having a smallest relative match ratio from the plurality of active templates when the limit of active templates as been reached to limit the number of active templates considered for use in compression;

creating, using the processor, a best active template when the total match ratio is less than the target total match ratio; and creating, using the processor, a compressed record including a reference to the best active template and a template delta that represents a difference between the best active template and one of the plurality of source data.

13. The method of claim 12, further comprising selecting a template having the smallest template delta from the plurality of active templates.

14. The method of claim 12, further comprising determining a match ratio between at least one active template and the source data.

15. The method of claim 12, wherein at least one active template includes an identifier, template data, a popularity metric, and an average match ratio.

16. The method of claim 15, further comprising determining a relative match ratio calculated as the average match ratio weighted by the popularity metric.

* * * * *